US008725876B2

(12) United States Patent
Phanse

(10) Patent No.: US 8,725,876 B2
(45) Date of Patent: May 13, 2014

(54) CLUSTER-FREE TECHNIQUES FOR ENABLING A DIRECTORY PROTOCOL-BASED DOMAIN NAME SYSTEM (DNS) SERVICE FOR HIGH AVAILABILITY

(75) Inventor: Madhavi R Phanse, Karnataka (IN)

(73) Assignee: Novell, Inc., Provo, UT (US)

( * ) Notice: Subject to any disclaimer, the term of this patent is extended or adjusted under 35 U.S.C. 154(b) by 86 days.

(21) Appl. No.: 13/183,203

(22) Filed: Jul. 14, 2011

(65) Prior Publication Data

US 2011/0271139 A1 Nov. 3, 2011

Related U.S. Application Data

(62) Division of application No. 12/399,181, filed on Mar. 6, 2009, now Pat. No. 7,996,532.

(51) Int. Cl.
*G06F 15/173* (2006.01)

(52) U.S. Cl.
USPC .......................................... 709/226; 709/223

(58) Field of Classification Search
USPC .................. 709/203, 222, 223, 226–229
See application file for complete search history.

(56) References Cited

U.S. PATENT DOCUMENTS

| 6,718,383 | B1* | 4/2004 | Hebert | 709/224 |
| 6,769,048 | B2* | 7/2004 | Goldberg et al. | 711/141 |
| 2001/0030941 | A1* | 10/2001 | Musikka et al. | 370/221 |
| 2004/0210672 | A1* | 10/2004 | Pulleyn et al. | 709/245 |
| 2006/0271808 | A1* | 11/2006 | Raisch et al. | 714/1 |
| 2009/0164614 | A1* | 6/2009 | Christian et al. | 709/223 |
| 2010/0228853 | A1 | 9/2010 | Phanse | |

OTHER PUBLICATIONS

Deegan, et al., "The Main Name System: An Exercise in Centralized Computing", ACM Computer Communication Review vol. 35, (Oct. 2005).

\* cited by examiner

*Primary Examiner* — Yemane Mesfin
*Assistant Examiner* — Jeff Banthrongsack
(74) *Attorney, Agent, or Firm* — Schwegman, Lundberg & Woessner, P.A.

(57) ABSTRACT

Cluster-free techniques for enabling a directory protocol-based Domain Name System (DNS) service for high availability are presented. A DNS service monitors a node for wild-carded IP address that migrate to the node when a primary node fails to service DNS requests for a directory of the network. The DNS service forwards the wild-carded IP address to a distributed directory service for resolution and uses the distributed directory service to dynamically configure the DNS service for directly handling subsequent DNS requests made to the directory over the network while the primary node remains inoperable over the network.

20 Claims, 3 Drawing Sheets

CLUSTER-FREE TECHNIQUES FOR ENABLING A DIRECTORY PROTOCOL-BASED DOMAIN NAME SYSTEM (DNS) SERVICE FOR HIGH AVAILABILITY

This application is a divisional of U.S. patent application Ser. No. 12/399,181, filed on Mar. 6, 2009, now issued as U.S. Pat. No. 7,996,532, which is incorporated herein by reference in its entirety.

BACKGROUND

The Domain Name System (DNS) is a hierarchical naming system for devices and services participating in communication over the Internet. Generally, the DNS associates a variety of information with domain names assigned to participants on the Internet. The DNS also translates formats that are meaningful to humans into binary (machine-based) formats for purposes of locating and addressing devices/services over the World-Wide Web (WWW). Essentially, the DNS is analogous to a traditional phone book that translates device/service names (e.g., www.mydomain.com, etc.) located over a networks into Internet Protocol (IP) addresses (e.g., 111.11.111.111, etc.).

The DNS makes it possible to also assign domain names to groups of Internet users in a meaningful way that is independent of each user's physical location. So, WWW Uniform Resource Locator (URL) hypertext links and Internet contact information can remain consistent and constant even if the current Internet routing arrangements change or even if a particular user switches to a mobile device.

A DNS service is an infrastructure service that is often critical to communication functions of an enterprise. This service has to be highly available for enterprise user's to connect (24 hours a day and 365 days a year) to the network. Clustering techniques enable services for high availability by creating clusters of each service and its capabilities. However, not all enterprises can afford to invest in needed cluster hardware (Storage Area Network (SAN)) and expensive software (Internet Small Computer System Interface (iSCSI)), which supports clustering approaches.

Thus, what are needed are improved techniques for making a DNS service highly available, where those techniques do not require a cluster-based implementation or approach.

SUMMARY

In various embodiments, cluster-free techniques for enabling a directory protocol-based Domain Name System (DNS) service for high availability are presented. More specifically, and in an embodiment, a method is provided for DNS high availability.

DETAILED DESCRIPTION

As used herein a "resource" is an addressable and uniquely distinguishable entity, which is represented within a network, such as but not limited to, a user, a service, a group, a website, a domain, a device, objects, etc.

Various aspects of this invention discuss usage of a directory service protocol. In an embodiment, that directory service protocol is a Lightweight Directory Access Protocol (LDAP), which is used for querying and modifying directory resources, such as services or objects, that execute or that are accessible within a directory using Transmission Control Protocol (TCP)/IP. It is noted that in other cases different directory service protocols can be used with the teachings presented herein and below.

A "directory" is a set of objects (services) having similar attributes and that are organized in a logical and hierarchical manner over a network. The hierarchy of the directory is often referred to as a "tree," which uses identifiers, supplied via the Directory Name System (DNS), for structuring and organizing various levels of the tree.

A "directory service" is a directory manager at a higher level interface then the underlying directory service protocol that is accessible by applications and users to manage and access a directory. In an embodiment, the directory service is eDirectory® distributed by Novell, Inc. of Provo, Utah.

Also a "Highly-Available IP address" (HaIP) is an IP address that is bound to a Virtual Network Interface Card (NIC). In other words, this is a type of IP address that is not bound to a physical device. This means HaIP address is decoupled from the physical interface.

In an embodiment, the HaIP is transmitted to the network through dynamic routing protocols, such as Routing Information Protocol (RIP), Open Shortest Path First (OSPF), etc. With HaIP, the IP address of a service can follow the service from node to node in a single cluster as well as from node to node in separate, distinct clusters. This makes a client reconnection an easier task, the client just waits for the new route information to be transmitted to routers on the network. No manual steps or manual interactions are required; the IP address migrates automatically from a failed node to a failover node.

According to an embodiment, the techniques presented herein are implemented in eDirectory® and/or proxy-based products that are distributed by Novell®, Inc. of Provo, Utah. Also, in some embodiments, the Operating System (OS) is Linux, such as Suse® Linux, distributed by Novell®, Inc. of Provo, Utah.

Of course, the embodiments of the invention can be implemented in a variety of architectural platforms and products. Any particular architectural layout, product, or implementation presented herein is provided for purposes of illustration and comprehension only and is not intended to limit various aspects of the invention.

It is within this initial context, that various embodiments of the invention are now presented with reference to the FIGS. 1-4.

Figure 1:
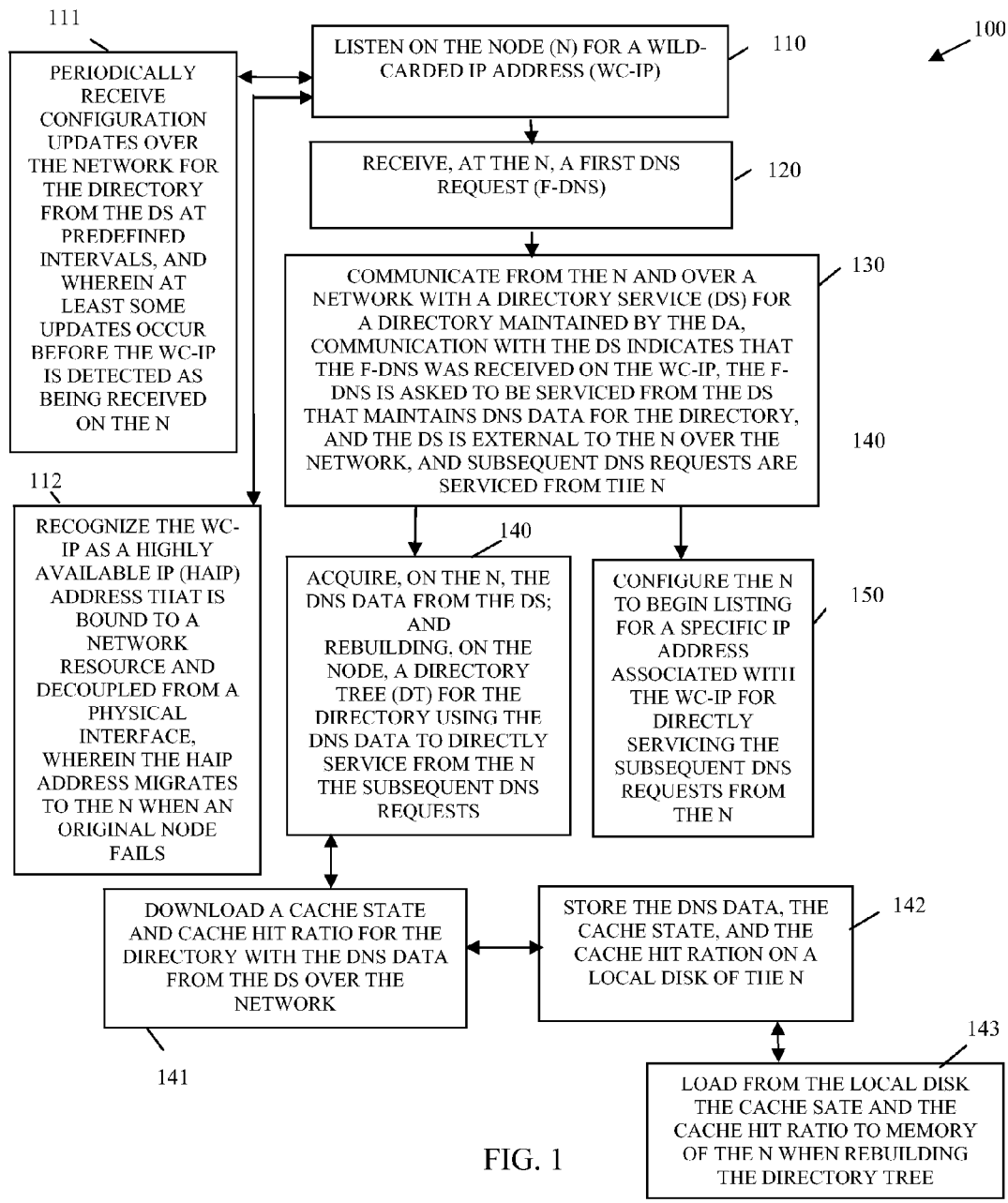
FIG. 1 is a diagram of a method that is provided for Domain Name System (DNS) service high availability, according to an example embodiment.

FIG. 1 is a diagram of a method 100 that is provided for DNS service high availability, according to an example embodiment. The method 100 (hereinafter "directory-based DNS service") is implemented as instructions in a machine-accessible and computer-readable storage medium. The instructions when executed by one or more network-based machines (processing devices, processors, computers, etc.) perform the processing depicted in FIG. 1. So, the directory-based DNS service is also operational over and processes within a network. The network may be wired, wireless, or a combination of wired and wireless.

The directory-based DNS service is implemented on a network node, such as a server in a client-server architecture and is accessible over the network, such as the Internet.

Originally, an original node of the network is being used to resolve IP addresses from a requestor that are associated with original DNS requests being made by the requestor. The original DNS requests are serviced from a directory managed by a distributed directory service but handled via the original node. An example distributed directory service is eDirectory® distributed by Novell, Inc. of Provo, Utah. Of course it is understood that any directory service can be used.

The original node is different from and external to the node that processes the directory-based DNS service and is located over the network (again, such as the Internet).

Additionally, the communication protocol used to service the original DNS requests is LDAP. Again, other directory-based protocols can be used when servicing the original DNS requests. Operations available via the directory-based protocol represent the available original DNS requests that can be made.

At 110, the directory-based DNS service listens on the node for a wild-carded IP address. That is, network resources that are accessible and resolved via the directory may include replicated services over the network, such that if the original node should fail, these other replicated services that were available on the original node can be used to provide failover and high availability access to the requestor. In one situation, the directory-based DNS service is configured to know which replicated services it has or can make available and it knows further what format or range of IP addresses these resources are associated with or identified by. So, the directory-based DNS service listens for IP addresses being received for these resources that it has available. The directory-based DNS service does not have to know each of the IP addresses, just a wild-carded format associated with the resources.

In an embodiment, at 111, the directory-based DNS service periodically receives configuration updates over the network for the directory from the distributed directory service. This can be configured to occur at predefined intervals. Moreover, at least some of these updates occur before any wild-carded IP address is detected as being received on the node by the directory-based DNS service. So, as will be explained in greater detail herein and below, the directory-based DNS service may be partially updates with the configuration for the directory before the wild-carded IP address is detected on the node by the directory-based DNS service.

In another situation, at 112, the wild-carded IP address is a HaIP address that is bound to a particular network resource and decoupled from any specific physical interface. This HaIP address is configured to automatically and dynamically migrate to the node for a replicated version of the resource when the original node that was servicing the original DNS requests for the requestor fails or becomes unresponsive. This is done in an automated and dynamic manner and without any manual intervention. The HaIP can do this using RIP, OSPF, and other dynamic routing protocols.

At 120, the directory-based DNS service receives or detects, at the node, a first DNS request. That is, it is a first DNS request for the node; but, other original DNS requests were being serviced by the original node that has become unresponsive and that forced the wild-carded IP address to migrate to the node and be detected by the directory-based DNS service, which was listening for the wild-carded IP address.

At 130, the directory-based DNS service communicates from the node and over the network with the directory service. Again, the directory service is maintaining the directory that was being used by the original failed node and that directory service keeps synchronization with the directory state and configuration of the directory as it is being accessed and modified by the original node. The communication from the directory-based DNS service and to the directory service indicates that the first DNS request was received for the WC-IP address. Here, the actual IP address detected is communicated to the directory service along with the first DNS request.

The directory service essentially maintains DNS data for the directory and again is external from the original node and the node and accessed over the network. The communication also asks the directory service to service the first DNS request on behalf of the node. This is done to maintain response time for the requestor of the first DNS request and to give the directory-based DNS service time to properly and dynamically configure itself for servicing subsequent DNS requests. So, subsequent DNS requests are to be serviced via the directory-based DNS service. This can be done in a variety of manners.

For example, at 140, the directory-based DNS service acquires, on the node, the DNS data from the directory service. Next, the directory-based DNS service uses the DNS data to rebuild a directory tree for the directory. At this point, the directory-based DNS service is in a position to directly service the subsequent DNS requests, without requesting assistance from the directory service. This also relieves the directory service from excessive load, since it is maintaining state and servicing a variety of nodes and asking the directory service to continually and regularly service DNS requests. Thus, this improves the overall response and processing efficiency of the distributed directory and ensures high availability.

Continuing with the embodiment at 140 and at 141, the directory-based DNS service downloads a cache state and cache hit ratio for the directory from the directory service. This includes the DNS data.

In a particular embodiment of 141 and at 142, the directory-based DNS service stores the DNS data, the cache state, and the cache hit ratio on a local disk or storage device of the node. Again, when the directory-based DNS service is being periodically updated with the configuration of the directory (as discussed with the embodiment of 111), the amount of downloaded DNS data may be minimal and in some situation may entail just acquiring the cache state and cache hit ratio or just a small amount of DNS data. So, the efficiency of this processing can be improved and may not be that processing intensive. Moreover, the processing of 140-143 occurs after the first DNS request was serviced, since the directory service was asked to service the first DNS request before the directory-based DNS service configured itself for servicing the subsequent DNS requests in the manners discussed at 140-143.

In still another situation of 142 and at 143, the directory-based DNS service loads the cache state and the cache hit ratio to memory of the node for purposes of rebuilding the directory tree. Once the directory tree is in memory and the original cache state and hit ratio of the failed original node is reconstituted in memory of the node, the directory-based DNS service is in a position to rapidly provide service for the subsequent DNS requests to the requestor or other requestors of the network.

In an embodiment, at 150, the directory-based DNS service configures the node to begin listening for a specific IP address that was associated with or was the original wild-carded IP address. When this is combined with the embodiments of 140-143, the directory-based DNS service is prepared to quickly and efficiently provide high availability to requestors of the directory over the network in the absence of the original failing node, which has become unresponsive.

The directory-based DNS service operates without clustering approaches. That is, the directory-based DNS service is an alternative to cluster-based high available DNS processing for a directory. No clusters are required at all. The directory-based DNS service provides high availability to DNS services for a directory over a network (Internet, wide-area network (WAN), etc.) in a dynamic and processing and responsive efficient manner.

Figure 2:
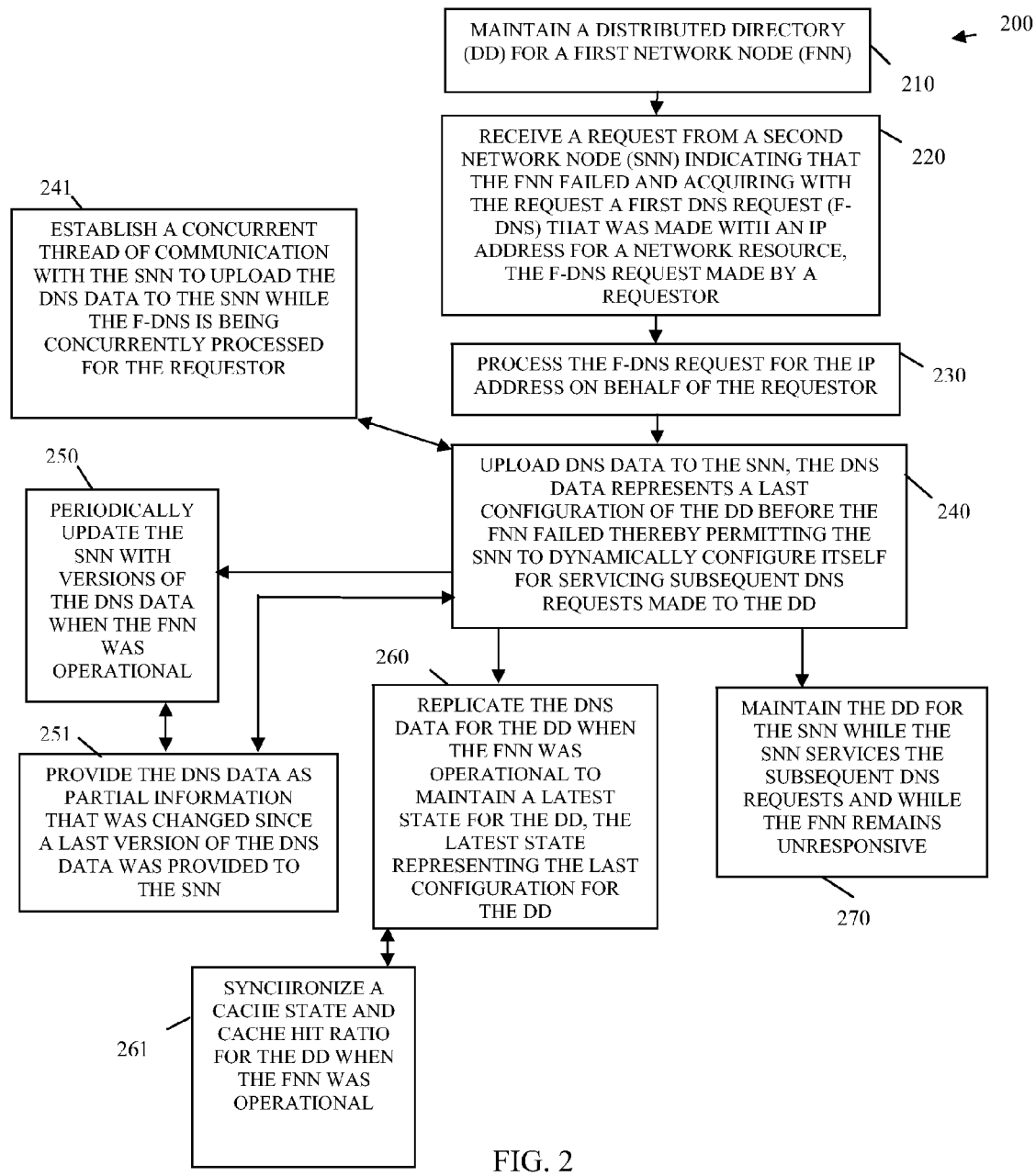
FIG. 2 is a diagram of another method that is provided for DNS service high availability, according to an example embodiment.

FIG. 2 is a diagram of another method 200 that is provided for DNS service high availability, according to an example embodiment. The method 200 (herein after referred to as "directory service") is implemented in a machine-accessible and computer-readable storage medium as instructions, which when accessed by one or more machines (processors, etc.) perform the processing depicted in the FIG. 2; the directory service is also operational over a network; and the network may be wired, wireless, or a combination of wired and wireless.

The directory-based DNS service of the method 100 presented in FIG. 1 provides processing from the perspective of a network node that takes over in servicing DNS requests for a directory when an original network node fails. Again, this is done without clusters or cluster-based approaches.

The directory service provides a processing perspective of DNS high availability service from the perspective of a distributed network directory service. That is, the directory service facilitates the initial configuration of the network node presented in the method 100 of the FIG. 1, and perhaps performs other enhanced features as discussed herein and below. In an embodiment, the directory service is a modified version of an existing directory service that is enhanced to achieve the novel teachings presented herein and below. In one case, that modified directory service is a modified and enhanced version of eDirectory® distributed by Novell, Inc. of Provo, Utah.

At 210, the directory service maintains a distributed directory for a first network node (such as the original failing node discussed above with the method 100 of the FIG. 1).

At 220, the directory service receives a request for a second network node indicating that the first network node failed. The directory service acquires with the request a first DNS request that was made with an IP address for a network resource. In an embodiment, the IP address is a HaIP address that automatically and dynamically migrates to the second network node when it detects that the first network node has failed. It is noted that since the directory service maintains the distributed directory, the request does not have to specifically indicate that the first network node failed, the directory service may be fully aware that the first network node is no longer responsive. The directory service recognizes, and perhaps authenticates, the second network node as being a fail over and highly available DNS service provider for the directory that the first network node was servicing when the directory service receives the first DNS request with the IP address from the second network node. So, the request itself that is received may just be the forwarded first DNS request with the IP address that the second network node forwards to the directory service upon detection of the IP address on the second network node.

The mechanisms and processing for the second network node were discussed in detail above with reference to the method 100 of the FIG. 1.

At 230, the directory service processes the first DNS request for the IP address on behalf of the requestor. That is, the directory service is used as the DNS service provider for the requestor to resolve the IP address for a network resource for the first DNS request so as to give time to the second network node to become the DNS service provider for the directory. This provides a quicker responsive time to the requestor than what would have to occur if the requestor was forced to wait while the second network node reconstituted the directory tree for the directory.

At 240, the directory service uploads DNS data to the second network node. The DNS data represents a last configuration of the distributed directory before the first network node had failed. This permits the second network node to dynamically configure itself for servicing subsequent DNS requests that are made to the distributed directory.

According to an embodiment, at 241, the directory service establishes a concurrent thread of communication with the second network node for purposes of uploading the DNS data to the second network node while the first DNS request is being concurrently processed for the requestor. If the directory service is on a multiprocessor machine, then this uploading can begin in parallel with the servicing of the first DNS request.

In an embodiment, at 250, the directory service periodically updates the second network node with versions of the DNS data when the first network node was operational. So, at 251, the directory service can provide the DNS data to the second network node back at 240 as partial information representing just the incremental changes that occurred since a last version of the DNS data was provided to the second network node. This further improves the operational efficiency of the upload operation.

In one case, at 260, the directory service replicates the DNS data for the distributed directory when the first network node was operational. This is done to maintain a latest or most current state for the distributed directory as it existing on the first network node when the first network node failed. The latest state thusly represents the last configuration for the distributed directory.

Continuing with the embodiment at 260 and at 261, the directory service synchronizes a cache state and cache hit ratio that existed on first network node for the distributed directory when the first network node was operational. So, the entire directory tree can be re-established when the first network node fails on the second network node via the DNS data and cache information.

In another situation, at 270, the directory service maintains the distributed directory for the second network node while the second network node services the subsequent DNS requests and while the first network node remains unresponsive. This is done should the second network node fails, such that when the IP address migrates to yet a third network node the processing discussed herein and above with reference to the directory service can be repeated for the third network node to become a DNS service provider for the directory.

Also, it is noted that the DNS service provider capabilities of the second network node can be migrated back to the first network node and away from the second network node when the first network node comes back online and is operational again.

Figure 3:
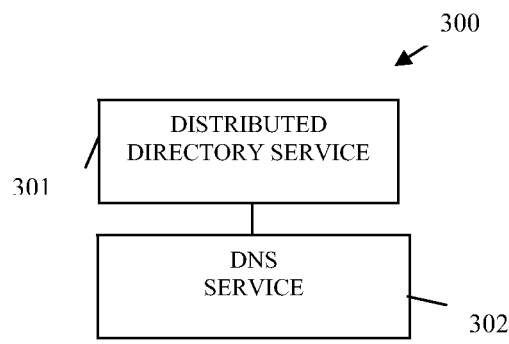
FIG. 3 is a diagram of a DNS service high availability system, according to an example embodiment.

FIG. 3 is a diagram of a DNS service high availability system 300, according to an example embodiment. The DNS service high availability system 300 is implemented in a machine-accessible and computer-readable storage medium as instructions, which when executed by one or more machines (computers or processor-enabled devices) perform, among other things, the processing depicted in the methods 100 and 200 of the FIGS. 1 and 2, respectively. The DNS service high availability system 300 is also operational over a network; the network may be wired, wireless, or a combination of wired and wireless.

The DNS service high availability system 300 includes a distributed directory service 301 and a DNS service 302. Each of these components and their interactions with one another will now be discussed in turn.

The distributed directory service 301 is implemented in a computer-readable storage medium and to execute on a first device of a network (one or more processors). Example processing associated with the distributed directory service 301 was provided above in detail with reference to the method 200 of the FIG. 2.

The distributed directory service 301 monitors a distributed directory that is being managed on a primary node of the network to resolve IP addresses of network resources. The distributed directory service 301 resolves a wild-carded IP address forwarded by the DNS service 302 when the primary node fails. Moreover, the distributed directory service 301 also facilitates and provides DNS data for configuring a recovery node and the DNS service 302 when the primary node fails so that the DNS service 302 and the recovery node can be used for resolving subsequent DNS requests made over the network to the directory while the primary node remains unresponsive.

According to an embodiment, the wild-carded IP address is a HaIP address that is bound to a network resource of the directory and is decoupled from any specific physical device of the network. A dynamic routing protocol permits the HaIP address to migrate from the primary node to the recovery node when the primary node fails.

In an embodiment, the distributed directory service 301 monitors the directory by maintaining DNS data for the directory as accessed and as modified on the primary node while the primary node is operational.

The DNS data includes directory details and metadata for the network resources of the directory that permit IP addresses for the network resources of the directory to be resolved for requestors. The DNS data also includes a last cache state and a last cache hit ration that existed on the primary node before it failed.

The DNS service 302 is implemented in a computer-readable storage medium executes on a recovery node of the network. Detailed processing associated with the DNS service 302 was provided above with reference to the method 100 of the FIG. 1.

The DNS service 302 receives the wild-carded IP address when a first DNS request to the primary node fails and the wild-carded IP address automatically and dynamically migrates to the recovery node of the DNS service 302. The DNS service 302 monitors the recovery node for the wild-carded IP address and when detected forwards the wild-carded IP address to the distributed directory service 301. The first DNS request is resolved by the distributed directory service 301. Concurrently or immediately thereafter, the DNS service 302 configures itself via DNS data acquired from the distributed directory service 301 for directly handling all subsequent DNS requests for resolving subsequent IP addresses made to the directory.

In an embodiment, the DNS service 302 downloads the DNS data from the distributed directory service 301 and the first device to a local disk of the recovery node. The DNS service 302 then uploads the last cache state and the last cache hit ratio to memory of the recovery node and uses the DNS data to rebuild a directory tree for the directory for purposes of directly resolving the subsequent DNS requests without assistance from the distributed directory service 301.

Figure 4:
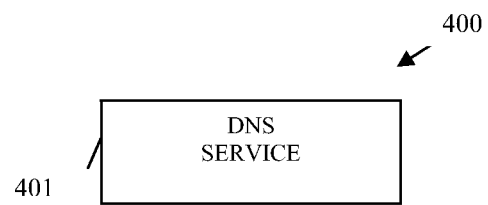
FIG. 4 is a diagram of another DNS service high availability system, according to an example embodiment.

FIG. 4 is a diagram of another DNS service high availability system 400, according to an example embodiment. The DNS service high availability system 400 is implemented as instructions on or within a machine-accessible and computer-readable storage medium. The instructions when executed by one or more machines (processor-enabled devices) perform, inter alia; the processing depicted with respect to the methods 100, 200 of the FIGS. 1-2, respectively, and the system 300 of the FIG. 3. The DNS service high availability system 400 is also operational over a network and the network may be wired, wireless, or a combination of wired and wireless.

The DNS service high availability system 400 is another and in some cases enhanced perspective to the DNS service high availability system 300 represented by the FIG. 3 and presented above.

The DNS service high availability system 400 includes a DNS service 401.

The DNS service 401 is implemented in a computer-readable storage medium and executes on a recovery node (having one or more processors) of the network. Processing associated with the DNS service 401 was provided in detail above with reference to the methods 100 and 200 of the FIGS. 1 and 2, respectively, and with respect to the system 300 of the FIG. 3.

The DNS service 401 is configured for detecting wild-carded IP addresses. The wild-carded IP address dynamically migrated to the recovery node when a primary node fails. The primary node was managing a directory over the network and acting as a DNS service provider for the directory before it fails.

Also, the DNS service 401 dynamically configures itself, without a clustering technique, for purposes of resolving the wild-carded IP addresses made to network resources of a directory on behalf of the primary node while the primary node remains inoperable over the network.

According to an embodiment, the DNS service 401 interacts with a distributed directory service for purposes of dynamically configuring itself with DNS data for the directory. The DNS data was maintained by the distributed directory service for the primary node when the primary node was operational over the network.

Also, the distributed directory service 401 resolves a first wild-carded IP address for the DNS service. The first wild-carded IP address is received by the DNS service 401 immediately after the primary node failed. Further, the distributed directory service resolves the first wild-carded IP address to permit the DNS service 401 to configure itself for servicing subsequent DNS requests.

It is now apparent how searching a file system for files/documents can be substantially improved by storing search criterion for previous successfully searches in extended file attributes of the files that match that search criterion and accounting for date and time stamps as to when the previous searches were conducted. The techniques discussed herein and above reduce the amount of content that has to be fully scanned during a file system search and thereby increases response times for the search and reduces processing load. This is particularly useful when voluminous files are present on a file system but is also beneficial in standalone individual laptop for an individual user.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented as executable instructions in a non-transitory computer-readable storage medium to process on one or more processors and to perform the method, comprising;
    maintaining, by the one or more processors, a distributed directory for a first network node;
    receiving, by the one or more processors, a request from a second network node indicating that the first network node failed and acquiring with the request a first Domain Name System (DNS) request that was made with an Internet Protocol (IP) address for a network resource, the first DNS request made by a requestor;
    processing, by the one or more processors, the first DNS request for the IP address on behalf of the requestor; and
    uploading, by the one or more processors, DNS data to the second network node, the DNS data represents a last configuration of the distributed directory before the first network node failed thereby permitting the second network node to dynamically configure itself for servicing subsequent DNS requests made to the distributed directory a directory tree for the directory is rebuilt on the second network node to handle the subsequent DNS requests without any further assistance from a distributed directory service.

2. The method of claim 1, wherein maintaining further includes replicating the DNS data for the distributed directory when the first network node was operational to maintain a latest state for the distributed directory, the latest state representing the last configuration for the distributed directory.

3. The method of claim 2, wherein replicating further includes synchronizing a cache state and cache hit ratio for the distributed directory when the first network node was operational.

4. The method of claim 1 further comprising, periodically updating, by the one or more processors, the second network node with versions of the DNS data when the first network node was operational.

5. The method of claim 4, wherein uploading further includes providing the DNS data as partial information that was changed since a last version of the DNS data was provided to the second network node.

6. The method of claim 1 further comprising, maintaining, by the one or more processors, the distributed directory for the second network node while the second network node services the subsequent DNS requests and while the first network node remains unresponsive.

7. The method of claim 1, wherein uploading further includes establishing a concurrent thread of communication with the second network node to upload the DNS data to the second network node while the first DNS request is being concurrently processed for the requestor.

8. A method implemented as executable instructions in a non-transitory computer-readable storage medium to process on one or more processors and to perform the method, comprising:
    acquiring, by the one or more processors, a last configuration of a distributed directory before a first network node failed:
    obtaining, by the one or more processors, a request made to the first network node and that is unprocessed, the request associated with a first Domain Name System (DNS) and an Internet Protocol (IP) address for a particular network resource being accessed with the request, a directory tree for the distributed directory rebuilt on a different node and available to handle the request upon the first network node failure without any further assistance from a distributed directory service; and
    processing, by the one or more processors, the request.

9. The method of claim 8 further comprising, configuring, by the one or more processors, a second network node with the last configuration to service subsequent requests directed to the first network node.

10. The method of claim 8, wherein acquiring further includes representing the last configuration as a latest state for the distributed directory before the first network node failed.

11. The method of claim 8, wherein acquiring further includes replicating the last configuration with the distributed directory.

12. The method of claim 11, wherein replicating further includes synchronizing a cache for the distributed directory when the first network node was operational.

13. The method of claim 8, wherein obtaining further includes identifying the IP address as a High Availability IP address that automatically and dynamically migrates itself to the second network node when the first network node is detected as having failed.

14. The method of claim 13, wherein obtaining further includes receiving the High Availability IP address, the DNS, and the request from the second network node that the High Availability IP address migrated to on failure of the first network node.

15. The method of claim 8, wherein processing further includes concurrently processing the request on behalf of the first network node that failed while configuring a second network node with the last configuration for handling subsequent requests made to the first network node while the first network node remains unresponsive.

16. The method of claim 15 further comprising, maintaining, by the one or more processors, the distributed directory on behalf of the second network node while the second network node handles the subsequent requests.

17. The method of claim 8 further comprising, processing the method, by the one or more processors, as a DNS service provider that takes over when the first network node fails to resolve the IP address for the particular network resource on behalf of an initial requestor.

18. A system implemented in a computer-readable storage medium and adapted to be executed by one or more processors of a network, comprising:
    a recovery node having non-transitory computer-readable medium programmed with executable instructions for a Domain Name System (DNS) service that executes on the recovery node of a network;

wherein the DNS service is configured to detect wild-carded IP addresses migrated to the recovery node when a primary node fails and wherein the DNS service dynamically configures itself without a clustering technique to resolve the wild-carded IP addresses made to network resources of a directory on behalf of the primary node while the primary nodes remains inoperable over the network, the recovery node having a rebuilt directory tree for the primary node that failed and the rebuilt directory tree used to service requests without any further assistance from a distributed directory service.

19. The system of claim 18, wherein the DNS service interacts with the distributed directory service to dynamically configure itself with DNS data for the directory and which was maintained by the distributed directory service for the primary node when the primary node was operational.

20. The system of claim 19, wherein the distributed directory service resolves a first wild-carded IP address for the DNS service, the first wild-carded IP address is received by the DNS service immediately after the primary node failed, the distributed directory service resolves the first wild-carded IP address to permit the DNS service to configure itself for servicing subsequent DNS requests.

* * * * *

UNITED STATES PATENT AND TRADEMARK OFFICE
CERTIFICATE OF CORRECTION

PATENT NO. : 8,725,876 B2  
APPLICATION NO. : 13/183203  
DATED : May 13, 2014  
INVENTOR(S) : Madhavi R. Phanse It is certified that error appears in the above-identified patent and that said Letters Patent is hereby corrected as shown below:

In the Claims:

In column 9, line 24-25, in Claim 1, delete "comprising;" and insert --comprising:--, therefor In column 10, line 12, in Claim 8, delete "failed:" and insert --failed;--, therefor In column 10, line 32, in Claim 11, delete "with" and insert --within--, therefor Signed and Sealed this  
Seventh Day of October, 2014

Michelle K. Lee  
*Deputy Director of the United States Patent and Trademark Office*